US008915682B2

(12) United States Patent
Mulanon

(10) Patent No.: US 8,915,682 B2
(45) Date of Patent: Dec. 23, 2014

(54) JIGS AND FIXTURES OF CNG CONTAINERS FOR MOTOR VEHICLES

(75) Inventor: Kasap Mulanon, Nakhon Ratchasima (TH)

(73) Assignee: Surayut Posirisuk, Bangkok (TH)

( * ) Notice: Subject to any disclaimer, the term of this patent is extended or adjusted under 35 U.S.C. 154(b) by 0 days.

(21) Appl. No.: 13/392,302

(22) PCT Filed: Aug. 11, 2010

(86) PCT No.: PCT/TH2010/000030
§ 371 (c)(1),
(2), (4) Date: Feb. 24, 2012

(87) PCT Pub. No.: WO2011/043745
PCT Pub. Date: Apr. 14, 2011

(65) Prior Publication Data
US 2012/0183370 A1 Jul. 19, 2012

(30) Foreign Application Priority Data
Oct. 5, 2009 (TH) ................................ 0901004521

(51) Int. Cl.
*B60P 7/08* (2006.01)
*F17C 13/08* (2006.01)

(52) U.S. Cl.
CPC ....... *F17C 13/084* (2013.01); *F17C 2205/0107* (2013.01); *F17C 2221/033* (2013.01); *F17C 2223/036* (2013.01); *F17C 2270/0168* (2013.01); *F17C 2223/0123* (2013.01)
USPC ............................................................ 410/50

(58) Field of Classification Search
USPC .......... 410/34, 35, 36, 47, 49, 42, 50; 248/69; 280/834; 180/69.5; 206/446; 211/85.18
See application file for complete search history.

(56) References Cited

U.S. PATENT DOCUMENTS 6,261,037 B1 * 7/2001 Richards et al. ................ 410/36
2009/0152043 A1 6/2009 Lee

OTHER PUBLICATIONS

International Search Report and Preliminary Report on Patentability for International Application No. PCT/TH2010/000030.

* cited by examiner

*Primary Examiner* — Stephen Gordon
(74) *Attorney, Agent, or Firm* — Warner Norcross & Judd LLP

(57) ABSTRACT

A CNG cylinder mounting device for a vehicle according to the present invention has parts different from the typical CNG cylinder mounting device: the gas cylinder supporting frame has a feature of a steel plate shaped into two gas cylinder placement frame units. Each unit uses a belt to fasten the upper cylinder, locks the gas cylinder to the cylinder placement frame unit, and has four cylinder placement frame supporting sleeves underneath. The cylinder placement frame supporting sleeves are placed on the bed supporting bracket whereas the bed support is placed on the bored bed floor and has four bracket supporting sleeves under the floor inside the through holes.

6 Claims, 6 Drawing Sheets

JIGS AND FIXTURES OF CNG CONTAINERS FOR MOTOR VEHICLES

BACKGROUND OF THE INVENTION (1) Field of the Invention

The invention is in the field of Engineering relating to a CNG (Compressed Natural Gas) cylinder mounting device for a vehicle.

(2) Description of Related Art

A structure for holding a CNG cylinder mounting device for a vehicle e.g. automobile, particularly pick up truck should be strong and able to hold the gas cylinder securely, preventing the movement or the slide ability thereof when the vehicle is running. However, the typical mounting device for the CNG cylinder for a vehicle installed on the bed is provided with a structure comprised of angle bars. Such structure exhibits a rather lower strength under the weight of a 98-kg gas cylinder apart from the force from many directions when the vehicle runs. Therefore the disadvantages of such structure include a shorter lifetime and a possible loosened valve installed at the gas cylinder head, causing the leakage of the gas.

BRIEF SUMMARY OF THE INVENTION

The mounting device for the CNG cylinder installed on the bed of a vehicle according to the present invention is characterized in that the structure is mainly made of flat metal plates and molded-to-shape metal whereas there are provided the upper and the lower cylinder fastening belts; a cylinder supporting frame unit comprising a belt supporting plate, a bracket, a cylinder placement frame, a front frame locking bracket, a rear frame locking bracket, an auxiliary bracket as well as other element parts besides metal work pieces including a cylinder placement frame sleeve, a bracket supporting sleeve, a upper cylinder fastening belt supporting rubber, a lower cylinder fastening belt supporting rubber. All of these parts will be assembled together with bolts, nuts or by means of fixing.

The object of the present invention is to develop a strong structure of a CNG cylinder mounting device in order to reduce the problem concerning the gas cylinder body frame whereas a strong structure of a CNG cylinder mounting device is invented to eliminate the problem concerning the gas cylinder body frame by making the mounting device for the gas cylinder and the bed frame mounting device strong and secure as if the mounting device for the CNG cylinder is part of the vehicle structure.

BRIEF DESCRIPTION OF THE SEVERAL VIEWS OF THE DRAWING(S)

DETAILED DESCRIPTION OF THE INVENTION

A CNG cylinder mounting device for a vehicle according to the present invention has parts different from the typical CNG cylinder mounting device: the gas cylinder supporting frame has a feature of a steel plate shaped into two gas cylinder placement frame units. Each unit uses a belt to fasten the upper cylinder, locks the gas cylinder to the cylinder placement frame unit, and has four cylinder placement frame supporting sleeves underneath. The cylinder placement frame supporting sleeves are placed on the bed supporting bracket whereas the bed support is placed on the bored bed floor and has four bracket supporting sleeves under the floor inside the through holes. The sleeves act as a supporting unit between the front transverse frame and the bed supporting bracket that is located at the front and a support between the rear transverse frame and the bed supporting bracket at the back. The gas cylinder mounting device unit is tightened to the front transverse frame and the rear transverse frame whereas under the front transverse frame, there is provided the front frame locking bracket sandwiched underneath while there are provided two frame locking brackets sandwiched underneath the rear transverse frame one for each side. Eight bolts are used to insert through the cylinder placement frame bracket, the cylinder placement frame supporting sleeves, the bed supporting bracket, the bracket supporting sleeves, the front and the rear of the transverse frame and the front and the rear of the frame locking bracket and tightened with nuts to lock the CNG cylinder mounting device installed on the bed with the frame underneath the bed which is the main frame of the vehicle.

Figure 1:
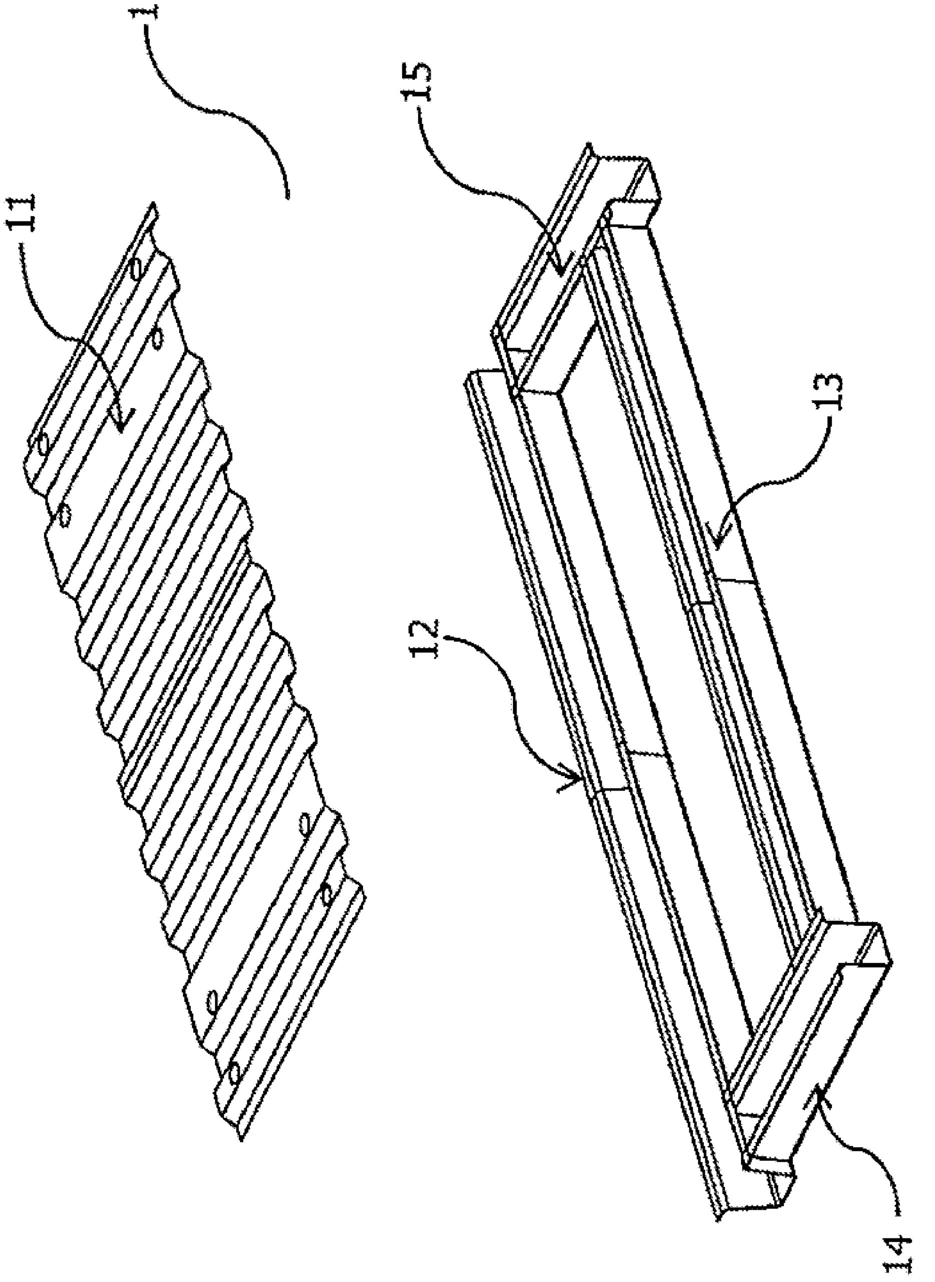
FIG. 1 illustrates a specific area of the frame unit and the bed floor for the installation of a CNG cylinder mounting device for a vehicle according to the present invention.

According to FIG. 1, it illustrates the structure of a bed flame unit 1 under the bed floor of the vehicle comprising a front transverse frame 12, a rear transverse frame 13, a left-side frame 14, and a right-side frame. All of these parts will be assembled together by means of fixing at the location for installing the mounting device for the CNG cylinder on the bed according to the present invention whereas the front transverse frame 12 is provided at the front of the vehicle near the cab (not shown in the figure); the rear transverse frame 13 is placed next from the front transverse frame 12 to the rear of the vehicle body (not shown in the figure); the left-side frame 14 is placed on the left parallel to the vehicle body (not shown in the figure); and the right-side frame 15 is placed on the right parallel to the vehicle body (not shown in the figure).

Figure 2:
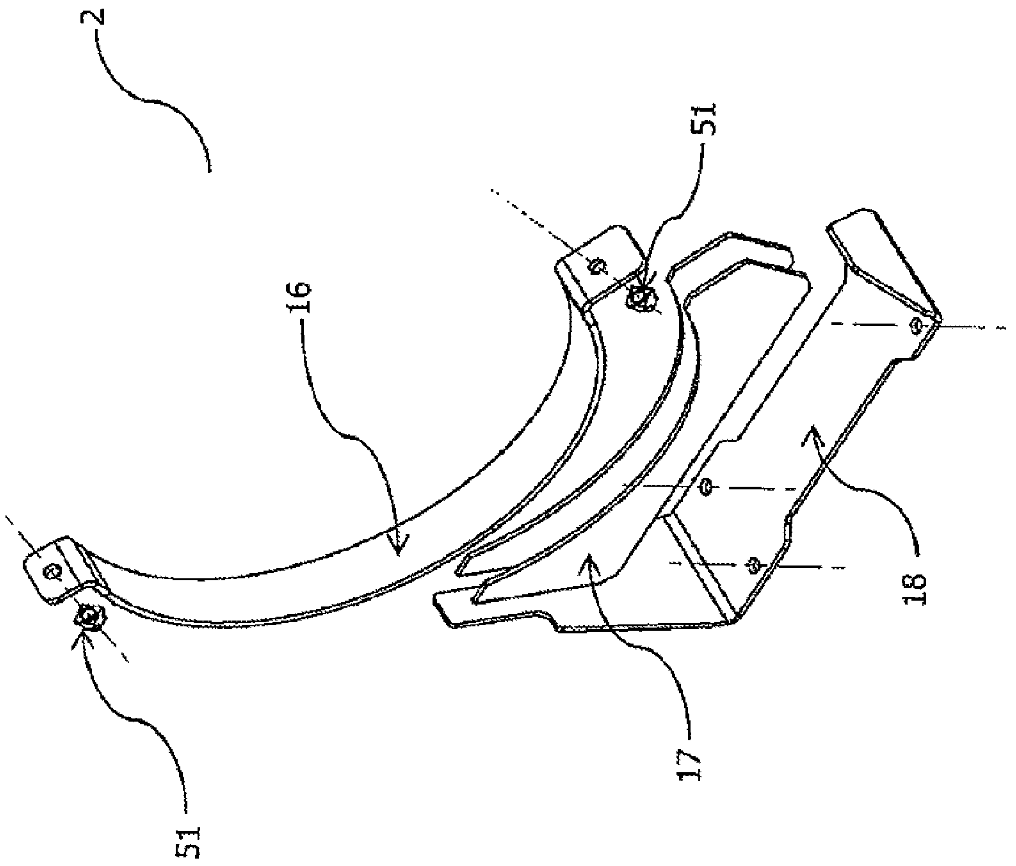
FIG. 2 illustrates parts of the gas cylinder supporting frame unit located in the CNG cylinder mounting device for a vehicle according to the present invention.

According to FIG. 2, it illustrates a gas cylinder placement frame unit 2 comprising a cylinder placement frame bracket 18 having a feature of a plate with folded angle wings whereas on the base of the work piece, there are provided four holes for the bolts 61 to go through. Also provided are two cylinder supporting plates 17 sandwiching the cylinder placement frame bracket 18 vertically to support the gas cylinder 70 (not shown in the figure). On the top, there is provided the lower cylinder fastening belt 16 having a feature of an arched steel bar in relation to the radius of the curve of the gas cylinder 70 whereas both ends thereof will be folded orthogonally and have one bolt through hole 62 on each end. At each of the hole mouths, there is provided a spot nut 51 fixed below the lower cylinder fastening belt 16. By means of fixing, the cylinder placement frame bracket 18, the cylinder supporting plate 17, the lower cylinder fastening belt 16 and spot nuts 51 are assembled together to provide the gas cylinder placement frame unit 2 whereas two gas cylinder placement frame units 2 are required to assembled to make the mounting device for the CNG cylinder for a vehicle according to the present invention.

Figure 3:
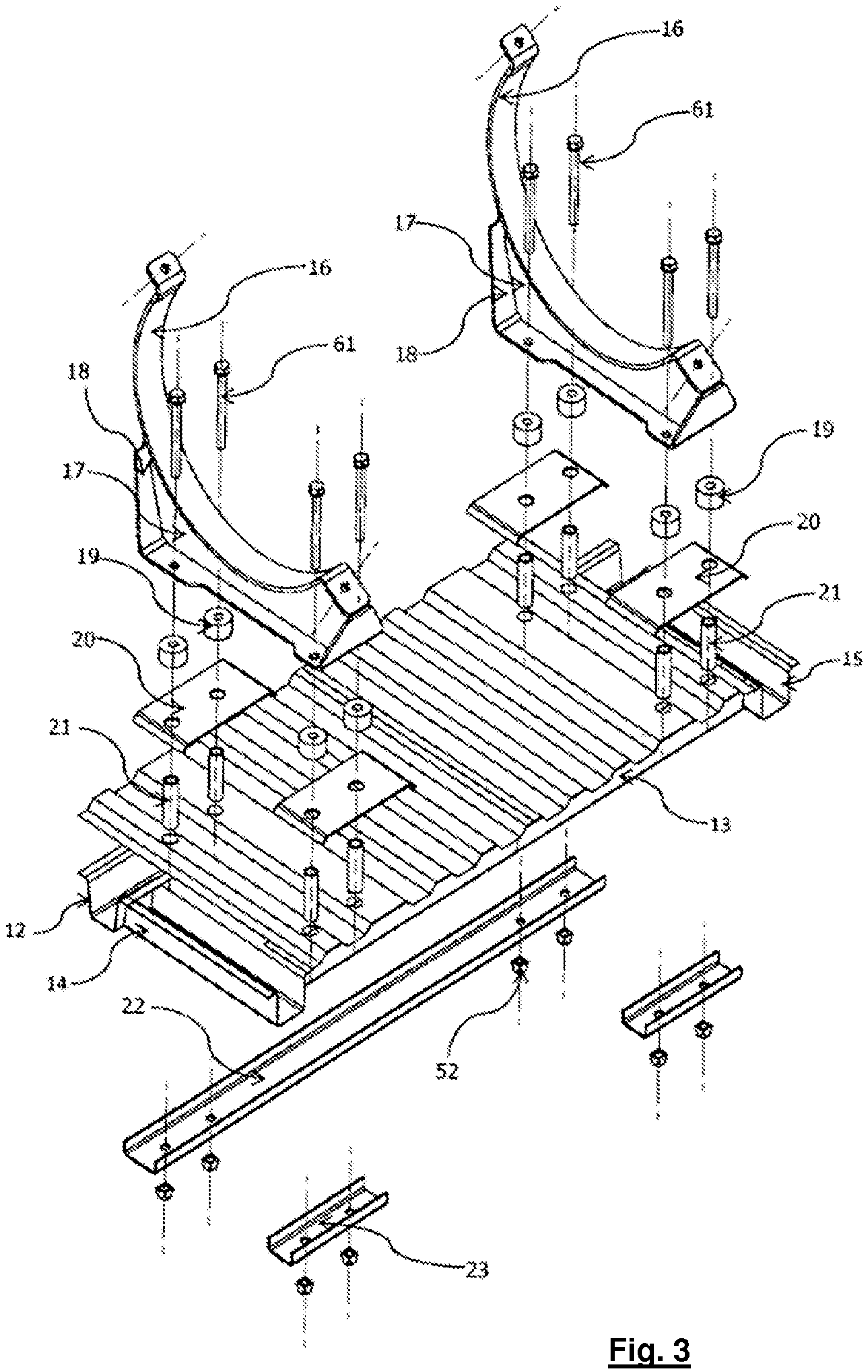
FIG. 3 illustrates parts to assemble with the bed frame body and the bed floor of the CNG cylinder mounting device for a vehicle according to the present invention.

According to FIG. 3, it illustrates parts assembled with the bed frame 1. Prior to the installation of the mounting device for the CNG cylinder for a vehicle according to the present invention, it's required to locate the positions of the fixing holes for the gas cylinder placement frame unit 2 whereas it is necessary to layout the locations of eight through holes on the bed floor 11 wherein the locations of thereof are divided into four spots, each of which has two holes: two holes on the left side of the front transverse frame 12 and another two holes of the right side thereof, and two holes on the left side of the rear transverse frame 13 and another two holes on the right side thereof. The size of the holes on the bed floor 11 has to be slightly larger than that of the bracket supporting sleeve 21 to allow the said bracket supporting sleeve 21 to be put into the holes. The bolt through holes 61 are made concentrically with the through holes on the bed floor 11 on the front transverse frame 12 and the rear transverse frame 13 in a total of 8 spots.

To assemble the gas cylinder placement frame unit 2 with the bed frame unit 1, the eight bracket supporting sleeves 21 are inserted into the holes on the bed floor 11 whereas upon the insertion, the base of the four bracket supporting sleeves 21 is placed into the U shaped groove of the front transverse frame 12 and that of another four sleeves is placed into that of the rear transverse frame 13 whereas the upper edges of the bracket supporting sleeves 21 are slightly above the bed floor 11. The bed supporting bracket 20 featuring four plates 61 having two bolt through holes each and folded angle wings is placed on the bed floor 11 at the corresponding four fixing spots whereas the positions of the bolt through holes 61 are aligned with that of the bracket supporting sleeves 21. The bed supporting bracket 20 acts as a cylinder placement supporting frame sleeves 19 preventing the weight of the CNG cylinder mounting device unit according to the present invention installed on the bed floor 11 from directly pressing upon the bed floor 11. The eight cylinder placement frame supporting sleeves 19 are placed on the bed supporting bracket 20 whereas the positions of the bolt through holes 61 of the cylinder placement frame supporting sleeve 19 and the bed supporting bracket 20 are aligned. The two gas cylinder placement frame unit 2 as assembled in FIG. 2 are placed upon the cylinder placement frame supporting sleeves 19 whereas the positions of the bolt through holes 61 of the cylinder placement frame bracket 18 are aligned with the bolt through holes 61 of the cylinder placement supporting sleeves 19.

To assemble the front frame locking bracket 22 featuring a long steel plate folded to form a U shaped groove, on the base of the U shaped groove, there are provided four bolt through holes in the same interval of the through holes on the front transverse frame 12. Four spot nuts are individually fixed at the four holes under the groove. The front frame locking bracket is assembled with the bottom of the front transverse frame 12 whereas the positions of the bolt through holes 61 of the front frame locking bracket 22 and the front transverse frame 12 are aligned correspondingly. The four bolts 61 are inserted into the through holes on the cylinder placement frame bracket 18, the cylinder placement frame supporting sleeves 19, the bed supporting bracket 20, the bracket supporting sleeves 21, the front transverse frame 12, and the front frame locking bracket 22. Then the bolts are tightened to the four spot nuts 52 fixed under the front frame bracket 22. Thereafter, two of the rear frame locking brackets 23 having a similar feature to the front frame locking bracket 22 but shorter and having only two bolt through holes 61 are assembled with the bottom of the rear transverse frame 13 on both left and right sides whereas the two bolt through holes 61 on the rear frame locking bracket 23 are aligned with the bolt through holes 61 of the rear frame bracket 13. The four bolts 61 are inserted into the bolt through holes on the cylinder placement frame bracket 18, the cylinder placement frame sleeves 19, the bed supporting bracket 20, the bracket supporting sleeves 21, the rear transverse frame 13 and the rear frame locking bracket 23. Then the bolts are tightened to the four spot nuts 52 fixed under the rear frame bracket 23.

Figure 4:
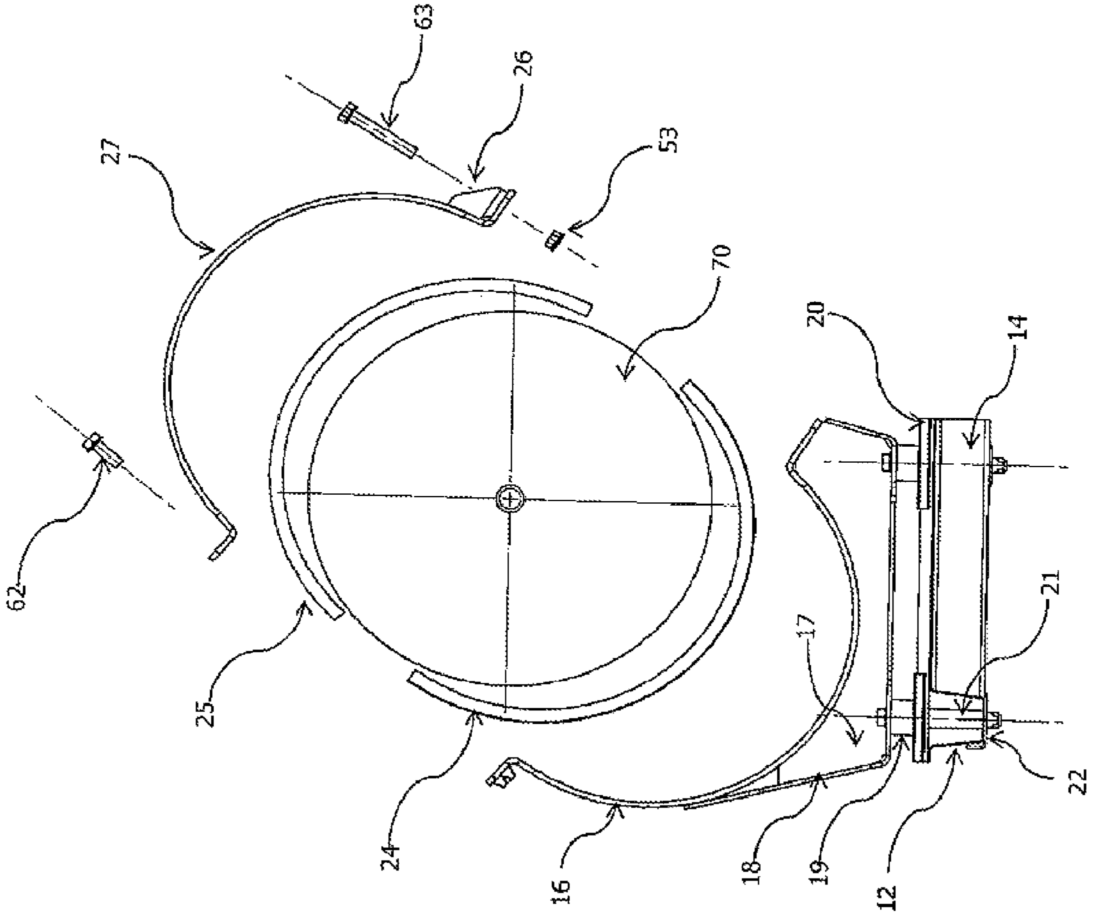
FIG. 4 illustrates the side view of the parts used to assemble the gas cylinder with the CNG cylinder mounting device for a vehicle according to the present invention.

According to FIG. 4, it illustrates the assembly of the gas cylinder 70 with the CNG cylinder mounting device unit for a vehicle according to the present invention including two lower cylinder fastening belt supporting rubber 24 assembled with the lower cylinder fastening belt 16 on both sides. The gas cylinder 70 is placed upon the lower cylinder fastening belt 16 assembled with the lower belt supporting rubber 24. Then the upper cylinder fastening belt 27 is assembled with the upper belt supporting rubber 25. Thereafter, the assembled unit is placed over the gas cylinder 70. The bolts 62 are inserted into the bolt through holes 62 on the upper cylinder fastening belt 27 and the lower cylinder fastening belt 16 and tightened to the spot nuts 51 fixed to the bottom of the lower cylinder fastening belt 16. The bolt 63 is inserted into the bolt through holes 63 on the auxiliary bracket 26 as a reinforcing unit for the upper cylinder fastening belt 27. Later the anti-loosening locking nuts 53 are tightened to the bolts 63 to the highest level and then the bolts 63 are pushed into the through holes on the lower cylinder fastening belt 16 before tightening them with the spot nuts 51 (not shown in the figure) fixed at the bottom of the lower cylinder fastening belt flange 16. Upon tightening, the anti-loosening locking nuts 53 are tightened compressively to the upper flange of the lower cylinder fastening belt 16 to prevent the bolts 63 from being loosened.

Figure 5:
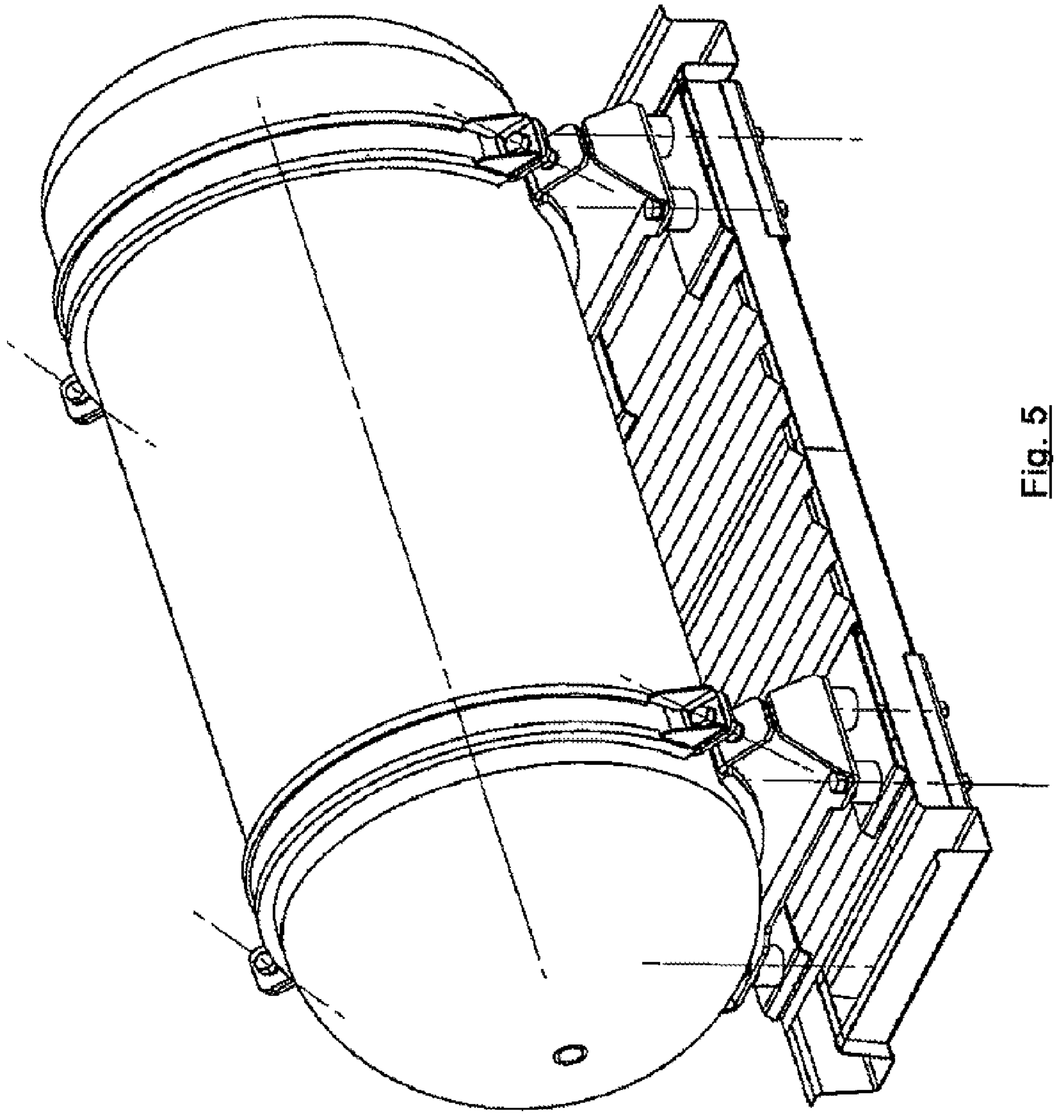
FIG. 5 illustrates the rear view of the complete installation of the CNG cylinder mounting device for a vehicle according to the present invention.

According to FIG. 5, it illustrates the back of the CNG cylinder mounting device for a vehicle according to the present invention upon the installation on the bed floor 11.

Figure 6:
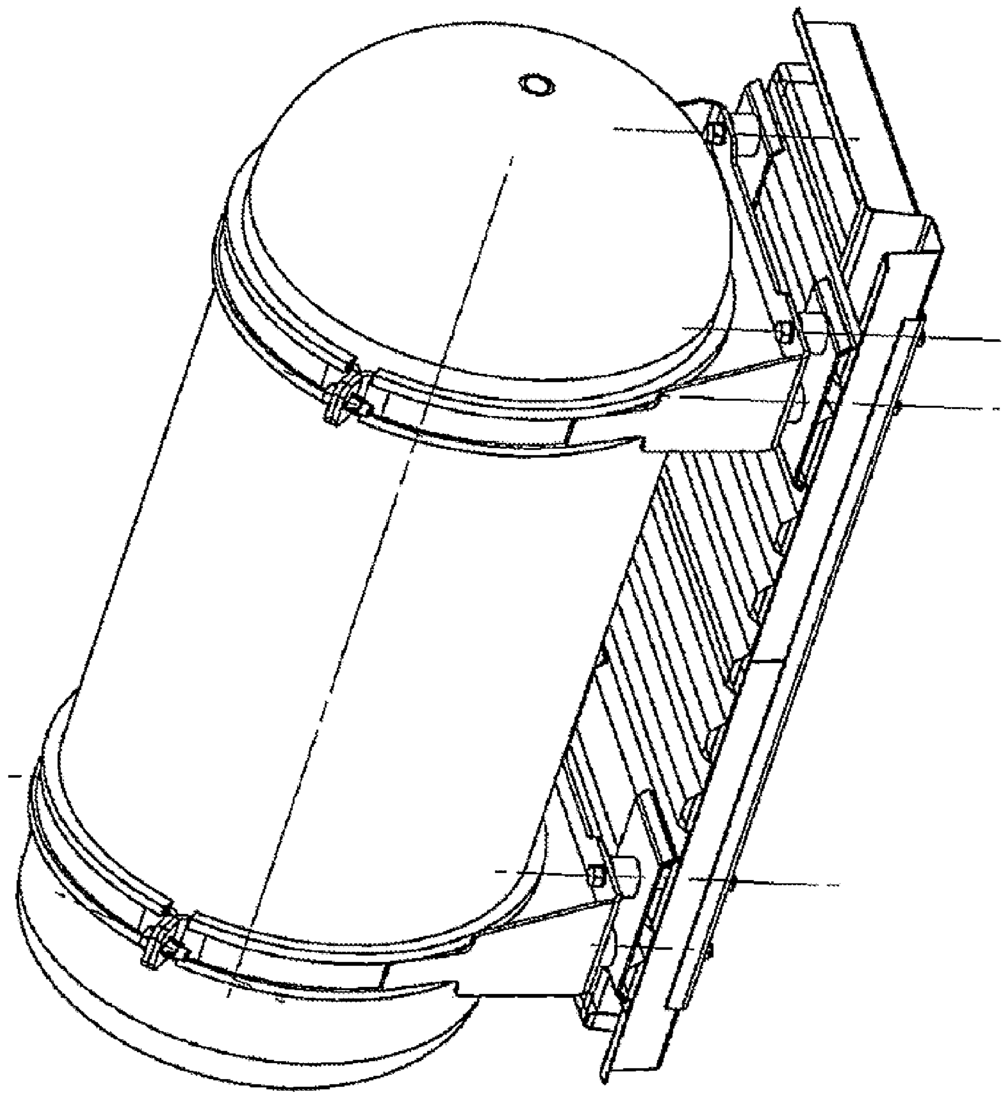
FIG. 6 illustrates the front view of the complete installation of the CNG cylinder mounting device for a vehicle according to the present invention

According to FIG. 6, it illustrates the front of the CNG cylinder mounting device for a vehicle according to the present invention upon the installation on the bed floor 11.

The invention claimed is:

1. A CNG cylinder mounting device for a vehicle comprising:

a plurality of assemblies, each assembly including at least two gas cylinder placement frame units, each unit having a lower cylinder fastening belt pre-assembled with a lower belt supporting rubber, an upper cylinder fastening belt pre-assembled with an upper belt supporting rubber, a connection member including a first plurality of spot nuts, a first plurality of anti-loosening locking nuts and a first plurality of bolts for connecting the lower cylinder fastening belt together with the upper cylinder fastening belt such that the anti-loosening locking nuts are tightened with the bolts before tightening them with the spot nuts fixed at the bottom of a flange of the lower cylinder fastening belt, a cylinder supporting plate for supporting the lower cylinder fastening belt, and a cylinder placement frame bracket for supporting the cylinder supporting plate;

wherein each gas cylinder placement frame unit is connected on a bed frame unit having a bed floor on a plurality of frames placed to support the bed floor with the connection member including a second plurality of nuts and a second plurality of bolts; and at least one bolt of the second plurality of bolts is inserted into the cylinder placement frame bracket in penetration through the bed floor of the bed frame unit and screwed into at least one nut of the second plurality of nuts.

2. The CNG cylinder mounting device for a vehicle according to claim 1 wherein the gas cylinder placement frame units further having a plurality of bed supporting brackets wherein each placement frame unit is mounted on the bed frame unit with the connection member including the second plurality of nuts and the second plurality of bolts; and wherein the at least one bolt is inserted into the cylinder placement frame bracket and at least one of the plurality of bed supporting brackets in penetration through the bed floor and screwed into the at least one nut.

3. The CNG cylinder mounting device for a vehicle according to claim 1 wherein the gas cylinder placement frame units further include a plurality of cylinder placement supporting sleeves, wherein each gas cylinder placement frame unit is mounted on the bed frame unit with the connection member including the second plurality of nuts and the second plurality of bolts; and wherein the at least one bolt is inserted into the cylinder placement frame bracket of the gas cylinder placement frame unit and at least one of the plurality of cylinder placement supporting sleeves in penetration through the bed floor of the bed frame and screwed into the at least one nut.

4. The CNG cylinder mounting device for a vehicle according to claim 3 wherein the gas cylinder placement frame units further include a plurality of bed supporting brackets, wherein the placement frame unit is mounted on the bed frame unit with the connection member including the second plurality of nuts and the second plurality of bolts; and wherein the at least one bolt is inserted into the cylinder placement frame bracket, the at least one cylinder placement supporting sleeve, and at least one of the plurality of bed supporting brackets in penetration through the bed floor and screwed into the at least one nut.

5. The CNG cylinder mounting device for a vehicle according to claim 4 wherein the gas cylinder placement frame units further include a plurality of bracket supporting sleeves, wherein the gas cylinder placement frame unit is mounted on the bed frame unit with the connection member including the second plurality of nuts and the second plurality of bolts; and wherein the at least one bolt is inserted into the cylinder placement frame bracket, the at least one cylinder placement supporting sleeve, the at least one bed supporting bracket, and at least one of the plurality of the bracket supporting sleeves in penetration through the bed floor and screwed into the at least one nut.

6. The CNG cylinder mounting device for a vehicle according to claim 5 wherein the gas cylinder placement frame units further include a plurality of frame locking brackets, wherein the gas cylinder placement frame unit is mounted on the bed frame unit with the connection member including the second plurality of nuts and the second plurality of bolts; and wherein the at least one bolt is inserted into the cylinder placement frame bracket, the at least one cylinder placement supporting sleeve, the at least one bed supporting bracket, and the at least one bracket supporting sleeve in penetration through the bed floor and at least one of the plurality of frame locking brackets and screwed into the at least one nut.

* * * * *